US008814123B2

(12) United States Patent
Suzuki et al.

(10) Patent No.: US 8,814,123 B2
(45) Date of Patent: Aug. 26, 2014

(54) SEAT TRACK

(75) Inventors: Hiromitsu Suzuki, Kanagawa (JP); Yoichi Takada, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 250 days.

(21) Appl. No.: 13/204,899

(22) Filed: Aug. 8, 2011

(65) Prior Publication Data

US 2012/0032060 A1 Feb. 9, 2012

(30) Foreign Application Priority Data

Aug. 9, 2010 (JP) .................................. 2010-178468

(51) Int. Cl.
*F16M 13/00* (2006.01)
*B60N 2/06* (2006.01)
*B60N 2/07* (2006.01)

(52) U.S. Cl.
CPC ................ *B60N 2/06* (2013.01); *B60N 2/0705* (2013.01)
USPC .......................... 248/430; 248/429; 296/65.01

(58) Field of Classification Search
USPC .......... 248/429, 430, 424, 419, 420; 297/311, 297/337, 318; 296/65.01, 65.11, 65.13, 296/65.14
See application file for complete search history.

(56) References Cited

U.S. PATENT DOCUMENTS 2,959,210 A * 11/1960 Pearlstine ................. 297/344.11
7,669,826 B2 * 3/2010 Hayakawa et al. ........... 248/430
2007/0176072 A1 * 8/2007 Ikegaya et al. ............... 248/429
2010/0320353 A1 * 12/2010 Kojima et al. ................ 248/430
2012/0199719 A1 * 8/2012 Yamada et al. ............... 248/430

FOREIGN PATENT DOCUMENTS

| JP | 2000-233670 | 8/2000 |
| JP | 2002-160554 | 6/2002 |
| WO | WO 2004/009398 A1 | 1/2004 |

OTHER PUBLICATIONS

European Search Report dated Nov. 21, 2011 issued in Application No. 11176024.5.

* cited by examiner

*Primary Examiner* — Alfred J Wujciak
(74) *Attorney, Agent, or Firm* — Finnegan, Henderson, Farabow, Garrett & Dunner, L.L.P.

(57) ABSTRACT

The invention relates to a seat track having a retainer arranged in a space extending in the fore-and-aft direction and the vertical direction between a lower rail and an upper rail and a lower ball and an upper ball rotatably supported on an upper portion and a lower portion of the retainer and configured to come into contact with both the lower rail and the upper rail, and is intended to provide a seat track in which vibrations in the vertical direction generated in the upper rail are reduced. There are provided a plurality of the lower balls and a plurality of the upper balls which are supported by the retainer, and a center-to-center distance between the plurality of lower balls lying next to each other is set to be different from a center-to-center distance between the plurality of upper balls lying next to each other.

3 Claims, 14 Drawing Sheets

SEAT TRACK

BACKGROUND OF THE INVENTION

1. Field of the Invention

The present invention relates to a seat track having a lower rail provided on the floor side, an upper rail configured to movably engage the lower rail and allow a seat to be mounted thereon, a retainer arranged in a space extending in the fore-and-aft direction and the vertical direction between the lower rail and the upper rail, a lower ball and an upper ball rotatably supported respectively by an upper portion and a lower portion of the retainer and configured to come into contact with both the lower rail and the upper rail.

2. Description of the Related Art

Referring now to FIG. 8 and FIG. 9, a seat track will be described. FIG. 8 is an exploded perspective view of a seat track in the related art, and FIG. 9 is a cross-sectional view taken along the line IX-IX when the seat track in FIG. 8 is assembled.

In these drawings, a seat track 1 includes a pair of lower rails provided on the floor side, and upper rails 5, 5' configured to movably engage the lower rails 3 and allow a seat to be mounted thereon.

Arranged between the lower rail 3 and the upper rails 5, 5' are retainers 7. Two lower balls 9, 9' and two upper balls 11, 11' which come into contact with both the lower rail 3 and the upper rails 5, 5' are rotatably supported by upper portions and a lower portions of the retainers 7 so as to reduce the sliding resistance between the lower rail 3 and the upper rails 5, 5' (for example, see JP-A-2000-233670).

In the seat track configured as described above, the hardness of the lower balls 9, 9' and the upper balls 11, 11' is higher than that of the lower rail 3 and the upper rails 5, 5'. Therefore, when the upper rails 5, 5' are used at the same position for a long time without being moved, indentations (indentations) are formed on the lower rail 3 and the upper rails 5, 5' by the lower balls 9, 9' and the upper balls 11, 11' due to the weight of a person seated thereon or a tensile load of a belt anchor. In this specification, the position of the upper rail 5 where these indentations are formed is referred to as "initial position".

Then, when the upper rails 5, 5' are moved from the initial positions, the lower balls 9, 9' and the upper balls 11, 11' may fall into the indentations, so that vibrations in the vertical direction may occur on the upper rails 5, 5'.

Referring now to FIGS. 10A to 10G, the vibrations in the vertical direction of the upper rails caused by the balls and the indentations will be described. FIG. 10A to FIG. 10G are configuration drawings in cross section taken along the line X-X in FIG. 9. The center-to-center distance of the lower ball 9 and the lower ball 9' of the retainers 7 is 10 mm, and the center-to-center distance of upper ball 11 and the upper ball 11' is 10 mm. The diameters of the lower balls 9, 9' and the upper balls 11, 11' are set so that the distance of movement of the centers of the lower balls 9, 9' and the upper balls 11, 11' become half the distance of movement of the upper rails 5, 5'.

FIG. 10A shows a state in which the upper rails 5, 5' are used at the same position for a long time without being moved, that is, the initial position. The lower rail 3 and the upper rail 5 are formed with the indentations at points indicated by "X" by the lower balls 9, 9' and the upper balls 11, 11'.

An indentation formed by the lower ball 9 on the lower rail 3 is designated by LL1, and an indentation formed by the lower ball 9 on the upper rail 5 is designated by LU1. An indentation formed by the lower ball 9' on the lower rail 3 is designated by LL2, and an indentation formed by the lower ball 9' on the upper rail 5 is designated by LU2. An indentation formed by the upper ball 11 on the lower rail 3 is designated by UL1, and an indentation formed by the upper ball 11 on the upper rail 5 is designated by UU1. An indentation formed by the upper ball 11' on the lower rail 3 is designated by UL2, and an indentation formed by the upper ball 11' on the upper rail 5 is designated by UU2.

Here, when the upper rail 5 is moved in one direction (leftward in the drawing) by 10 mm from the initial position, as shown in FIG. 10B, the centers of the lower balls 9, 9' and the upper balls 11, 11' move by 5 mm in the one direction.

When the upper rail 5 is moved from the state shown in FIG. 10B by 10 mm (20 mm from the initial position) in the one direction, as shown in FIG. 10C, the lower ball 9 falls into the indentation LU2 on the upper rail 5, the lower ball 9' falls into the indentation LL1 on the lower rail 3, the upper ball 11 falls into the indentation UU2 on the upper rail 5, and the upper ball 11' falls into the indentation UL1 on the lower rail 3. In other words, all the balls fall into the indentations, and the vibrations in the vertical direction occur in the upper rail 5.

When the upper rail 5 is further moved in the one direction from the state shown in FIG. 10C, as shown in FIG. 10D, the lower balls 9, 9' and the upper balls 11, 11' are positioned between the indentations LU1, LU2, UU1, and UU2 on the moving upper rail 5 and the indentations LL1, LL2, UL1, and UL2 on the fixed lower rail 3, so that the lower balls 9, 9' and the upper balls 11, 11' do not fall into the indentations.

In the same manner, when the upper rail 5 is moved in the other direction (rightward in the drawing) by 5 mm from the initial position, as shown in FIG. 10E, the centers of the lower balls 9, 9' and the upper balls 11, 11' move by 5 mm in the other direction.

When the upper rail 5 is moved from the state shown in FIG. 10E by 10 mm (20 mm from the initial position) in the other direction, as shown in FIG. 10F, the lower ball 9 falls into the indentation LL2 on the lower rail 3, the lower ball 9' falls into the indentation LU1 on the upper rail 5, the upper ball 11 falls into the indentation UL2 on the lower rail 3, and the upper ball 11' falls into the indentation UU1 on the upper rail 5. In other words, all the balls fall into the indentations, and the vibrations in the vertical direction occur in the upper rail 5.

When the upper rail 5 is further moved in the other direction from the state shown in FIG. 10F, as shown in FIG. 10G, the lower balls 9, 9' and the upper balls 11, 11' are positioned between the indentations LU1, LU2, UU1, and UU2 on the moving upper rail 5 and the indentations LL1, LL2, UL1, and UL2 on the fixed lower rail 3, so that the lower balls 9, 9' and the upper balls 11, 11' do not fall into the indentations.

In other words, in the configuration as shown in FIGS. 10A to 10G, when the upper rail 5 is moved, all the balls, that is, the lower balls 9, 9' and the upper balls 11, 11' fall into the indentations at three points shown FIG. 10A (the initial position), FIG. 10C, and FIG. 10F, and vibrations in the vertical direction occur in the upper rail 5.

SUMMARY OF THE INVENTION

In view of such problems, it is an object of the invention to provide a seat track in which vibrations in the vertical direction generated in the upper rail are reduced.

In order to achieve the object described above, a seat track according to a first aspect of the invention is a seat track including: a lower rail provided on the floor side; an upper rail configured to movably engage the lower rail and allow a seat to be mounted thereon; a retainer arranged in a space between the lower rail and the upper rail; three or more rotating bodies rotatably supported by the retainer and configured to come into contact with both the lower rail and the upper rail, wherein the rotating bodies are arranged in such a manner that all the rotating bodies do not fall into indentations simultaneously except for an initial position where the indentations are formed on the lower rail and the upper rail by the rotating bodies.

A seat track according to a second aspect of the invention is a seat track including: a lower rail provided on the floor side; an upper rail configured to movably engage the lower rail and allow a seat to be mounted thereon; a retainer arranged in a space between the lower rail and the upper rail; a plurality of lower rotating bodies rotatably supported by a lower portion of the retainer and configured to come into contact with both the lower rail and the upper rail; and a plurality of upper rotating bodies rotatably supported by an upper portion of the retainer and configured to come into contact with both the lower rail and the upper rail, wherein at least one center-to-center distance between the lower rotating bodies lying next to each other and at least one center-to-center distance between the upper rotating bodies lying next to each other are different, and the lower rotating bodies and the upper rotating bodies are arranged in such a manner that all the lower rotating bodies and all the upper rotating bodies do not fall into indentations simultaneously except for an initial position where the indentations are formed on the lower rail and the upper rail by the lower rotating bodies and the upper rotating bodies.

A seat track according to a third aspect of the invention is a seat track including: a lower rail provided on the floor side; an upper rail configured to movably engage the lower rail and allow a seat to be mounted thereon; a retainer arranged in a space between the lower rail and the upper rail; three or more rotating bodies rotatably supported by the retainer and configured to come into contact with both the lower rail and the upper rail, wherein the three or more rotating bodies are provided at positions different from each other in the fore-and-aft direction of the lower rail, and are arranged so that center-to-center distances in the fore-and-aft direction of the lower rail between rotating bodies lying next to each other are different from each other.

A seat track according to a fourth aspect of the invention is a seat track including: a lower rail provided on the floor side; an upper rail configured to movably engage the lower rail and allow a seat to be mounted thereon; a retainer arranged in a space between the lower rail and the upper rail; a plurality of lower rotating bodies rotatably supported by a lower portion of the retainer and configured to come into contact with both the lower rail and the upper rail; and a plurality of upper rotating bodies rotatably supported by an upper portion of the retainer and configured to come into contact with both the lower rail and the upper rail, wherein at least one center-to-center distance between the lower rotating bodies lying next to each other and at least one center-to-center distance between the upper rotating bodies lying next to each other are different.

According to the first aspect of the invention, three or more of the rotating bodies configured to come into contact with both the lower rail and the upper rail are provided, and the rotating bodies are arranged in such a manner that all the rotating bodies do not fall into indentations simultaneously except for an initial position where the indentations are formed on the lower rail and the upper rail by the rotating bodies. Accordingly, the vibrations in the vertical direction generated in the upper rail are reduced.

According to the second aspect of the invention, there are provided the plurality of lower rotating bodies configured to come into contact with both the lower rail and the upper rail and the plurality of upper rotating bodies configured to come into contact with both the lower rail and the upper rail, at least one center-to-center distance between the lower rotating bodies lying next to each other and at least one center-to-center distance between upper rotating bodies lying next to each other are different, and the lower rotating bodies and the upper rotating bodies are arranged in such a manner that all the lower rotating bodies and all the upper rotating bodies do not fall into the indentations simultaneously except for the initial position where the indentations are formed on the lower rail and the upper rail by the lower rotating bodies and the upper rotating bodies. Accordingly, the vibrations in the vertical direction generated in the upper rail are reduced.

According to the third aspect of the invention, there are provided the three or more rotating bodies configured to come into contact with both the lower rail and the upper rail, and the three or more rotating bodies are provided at the positions different from each other in the fore-and-aft direction of the lower rail, and are arranged so that the center-to-center distances in the fore-and-aft direction of the lower rail between rotating bodies lying next to each other are different from each other. Accordingly, the vibrations in the vertical direction generated in the upper rail are reduced.

According to the fourth aspect of the invention, there are provided the plurality of lower rotating bodies configured to come into contact with both the lower rail and the upper rail and the plurality of upper rotating bodies configured to come into contact with both the lower rail and the upper rail are provided, and at least one center-to-center distance between the lower rotating bodies lying next to each other and at least one center-to-center distance between the upper rotating bodies lying next to each other are different. Accordingly, the vibrations in the vertical direction generated in the upper rail are reduced.

DETAILED DESCRIPTION OF INVENTION

First Embodiment

Figure 1:
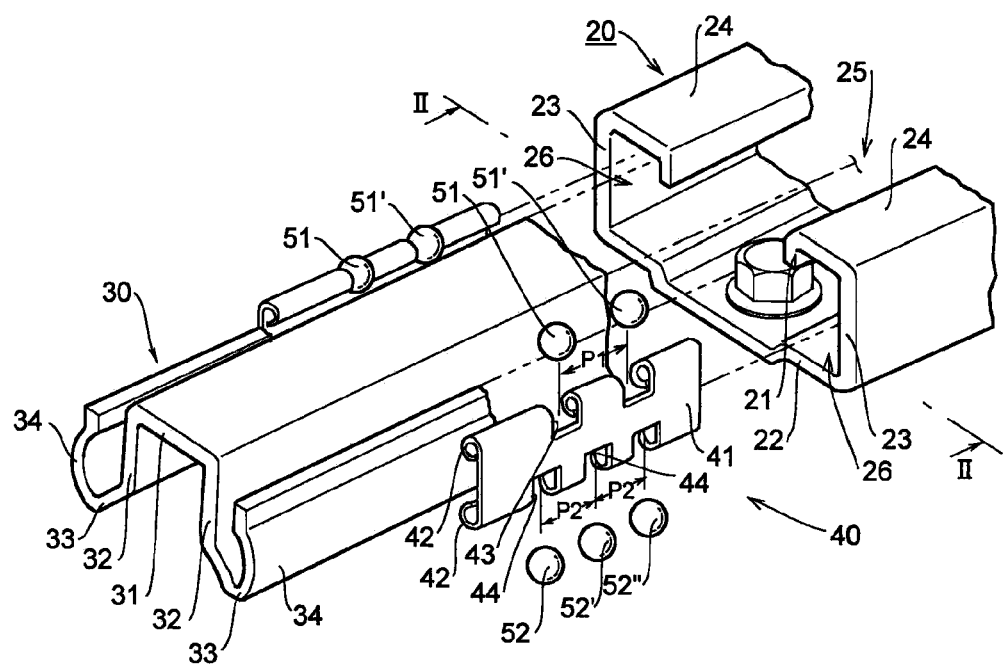
FIG. 1 is an exploded perspective view of a seat truck according to a first embodiment.
Figure 2:
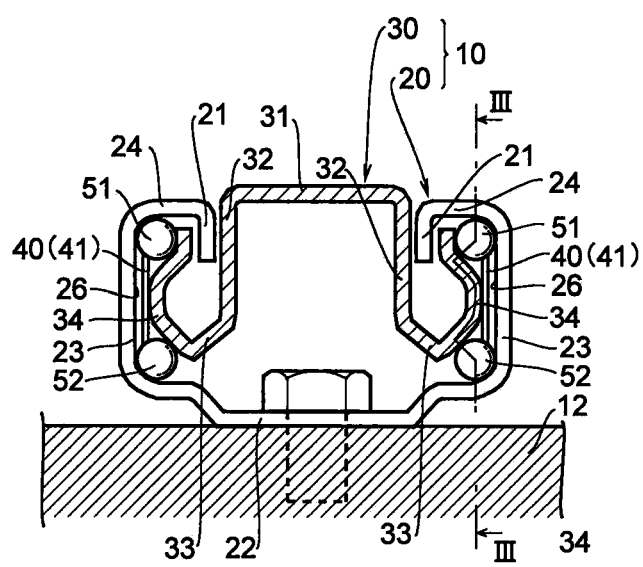
FIG. 2 is a cross-sectional view taken along the line II-II when the seat track in FIG. 1 is assembled.

Referring now to FIG. 1 and FIG. 2, a seat track according to a first embodiment will be described. FIG. 1 is an exploded perspective view of the seat truck according to the first embodiment, and FIG. 2 is a cross-sectional view taken along the line II-II when the seat track in FIG. 1 is assembled.

A seat track 10 includes a lower rail 20 to be fixed to a floor surface of a vehicle, and an upper rail 30 slidably fitted to the lower rail 20 and fixed to a lower surface of a seat S. The lower rail 20 and the upper rail 30 are both formed of an elongated member having a constant cross section. The terms "front, rear, left, right, up, and down" used below represent those with reference to the lower rail.

The lower rail 20 includes a bottom wall 22, left and right vertical walls 23 extending upward from left and right end portions of the bottom wall 22, upper walls 24 extending inward from upper end portions of the left and right vertical walls 23, and pending walls 21 pending from terminal end portions of the upper walls 24 toward the bottom wall 22, and has a substantially box-shaped cross section in bilateral symmetry. A portion between the pending walls 21 corresponds to an upper rail passage space 25.

The upper rail 30 includes an upper wall 31 to be fixed to the lower surface of the seat, left and right vertical walls 32 extending downward from left and right end portions thereof, inclined walls 33 extending laterally and obliquely outward from lower end portions of the left and right vertical walls 32, and walls 34 having an arcuate shape in cross-section extending upward from terminal end portions of the inclined walls 33, and has a cross section in bilateral symmetry. The upper wall 31 projects upward from the upper rail passage space 25 of the lower rail 20 when the lower rail 20 and the upper rail 30 are slidably fitted.

The walls 34 having an arcuate shape in cross-section of the upper rail 30 define a space 26 extending in the fore-and-aft direction and the vertical direction between the left and right vertical walls 23 of the lower rail 20. The walls 34 having an arcuate shape in cross-section get closest to the left and right vertical walls 23 at center portions thereof in the vertical direction, and define larger spaces at upper portions and lower portions of the center portions with respect to the left and right vertical walls 23 (with respect to corners connecting the bottom wall 22 and the upper walls 24 to the left and right vertical walls 23) than the center portions.

Retainers 40 are inserted into spaces 26 between the left and right vertical walls 23 of the lower rail 20 and the walls 34 having an arcuate shape in cross-section of the upper rail 30 so that the board thickness planes extend in the vertical direction. The spaces 26 extending in the fore-and-aft direction and the vertical direction between the lower rail 20 an the upper rail 30 are set to have a distance which makes the retainers 40 to be oriented in the vertical direction and does not allow the retainer 40 to incline. Each of the retainers 40 is formed of a metallic material having resiliency such as steel, and includes a flat portion 41 whose board thickness plane extend in the vertical direction and curled portions 42 formed at upper and lower end portions of the flat portion 41, and the upper and lower curled portions 42 includes ball holding indentations 43 and ball holding indentations 44 positioned at least both end portions in the longitudinal direction (the fore-and-aft direction).

Then, the ball holding indentations 43 and the ball holding indentations 44 are formed at positions shifted in the fore-and-aft direction. Two upper balls (upper rotating bodies) 51, 51' are rotatably supported in the ball holding indentations 43, and three lower balls (lower rotating bodies) 52, 52', 52" are rotatably supported in the ball holding indentations 44.

In the first embodiment, two of the ball holding indentations 43 are formed on an upper portion of the retainer 40 at a center-to-center distance (P1). Three of the ball holding indentations 44 are formed on a lower portion of the retainer 40 at a center-to-center distance (P2:P2≠P1).

In the seat track 10 having the configuration as described above, the spaces 26 extending in the fore-and-aft direction are formed between the left and right vertical walls 23 and the walls 34 having an arcuate shape in cross-section when the lower rail 20 and the upper rail 30 are fitted to each other. The retainers 40 having the upper balls 51 and the lower balls 52 received in the ball holding indentations 43 and the ball holding indentations 44 are respectively inserted into the fore-and-aft direction spaces 26.

In the assembled state as described above, the upper balls 51, 51' and the lower balls 52, 52', 52" respectively come into contact with parts of the lower rail 20 and the upper rail 30 and, when the upper rail 30 moves relatively with respect to the lower rail 20, the upper balls 51, 51' and the lower balls 52, 52', 52" roll in the ball holding indentations 43 and 44 to reduce the sliding resistance between the both rails.

Referring now to FIG. 3A to FIG. 3F and FIG. 4A to FIG. 4D, the operation according to the first embodiment will be described. FIG. 3A to FIG. 3F and FIG. 4A to FIG. 4D are configuration drawings in cross section taken along the line III-III in FIG. 2. The center-to-center distance P2 between the lower ball 52 and the lower ball 52' lying next to each other and the center-to-center distance P2 between the lower ball 52' and the lower ball 52" lying next to each other are 10 mm, and the center-to-center distance P1 between the upper ball 51 and the upper ball 51' lying next to each other is 15 mm. The diameters of the lower balls 52, 52', 52" and the upper balls 51, 51' are set so that the distance of movement of the centers of the lower balls 52, 52', 52" and the upper balls 51, 51' become half the distance of movement of the upper rail 30.

Figure 3A:
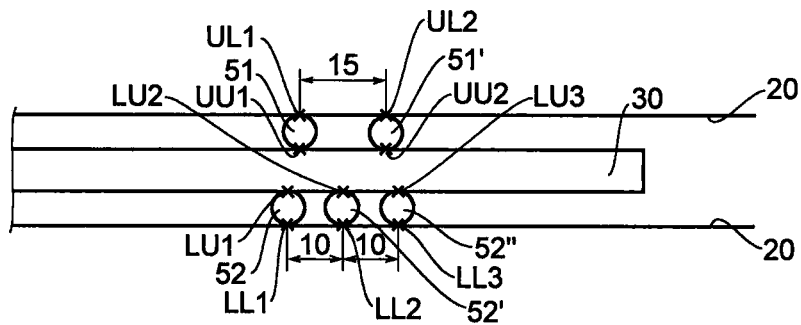
FIG. 3A to FIG. 3F are drawings for explaining the operation of the first embodiment and are configuration drawings in cross section taken along the line III-III in FIG. 2.

FIG. 3A shows the state in which the upper rail 30 is used at the same position for a long time without being moved, that is, the initial position. Then, the lower rail 20 and the upper rail 30 are formed with indentations at points indicated by "x" by the lower balls 52, 52', 52" and the upper balls 51, 51'.

The indentation formed by the lower ball 52 on the lower rail 20 is designated by LL1, and the indentation formed by the lower ball 52 on the upper rail 30 is designated by LU1. The indentation formed by the lower ball 52' on the lower rail 20 is designated by LL2, and the indentation formed by the lower ball 52' on the upper rail 30 is designated by LU2. An indentation formed by the lower ball 52" on the lower rail 20 is designated by LL3, and an indentation formed by the lower ball 52" on the upper rail 30 is designated by LU3.

The indentation formed by the upper ball 51 on the lower rail 20 is designated by UL1, and the indentation formed by the upper ball 51 on the upper rail 30 is designated by UU1. The indentation formed by the upper ball 51' on the lower rail 20 is designated by UL2, and the indentation formed by the upper ball 51' on the upper rail 30 is designated by UU2.

Figure 3B:
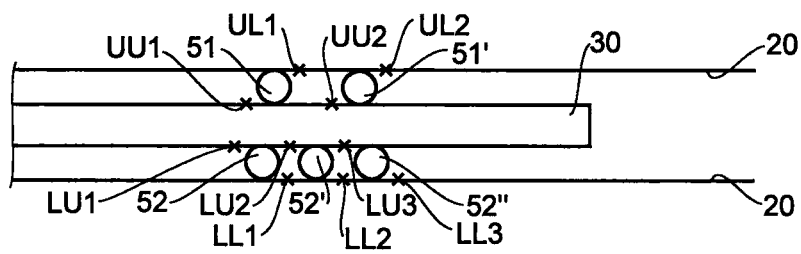

Here, when the upper rail 30 is moved in one direction (leftward in the drawing) by 10 mm from the initial position, as shown in FIG. 3B, the centers of the lower balls 52, 52', 52" and the upper balls 51, 51' move by 5 mm in the one direction.

Figure 3C:
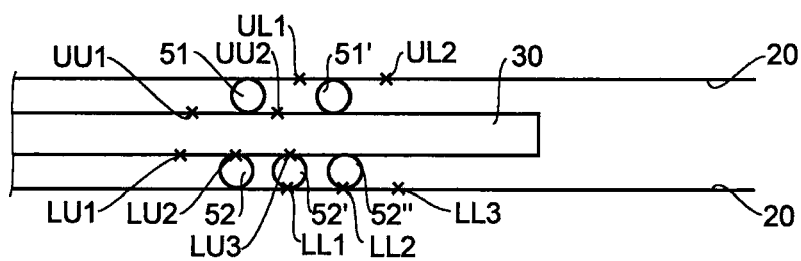

When the upper rail 30 is moved from the state shown in FIG. 3B by 10 mm (20 mm from the initial position) in the one direction, as shown in FIG. 3C, the lower ball 52 falls into the indentation LU2 on the upper rail 30, the lower ball 52' falls into the indentation LL1 of the lower rail 20 and the indentation LU3 on the upper rail 30, and the lower ball 52" falls into the indentation LL2 on the lower rail 20. However, since the other upper balls 51, 51' do not fall into the indentations, the vibrations in the vertical direction are not generated in the upper rail 30.

Figure 3D:
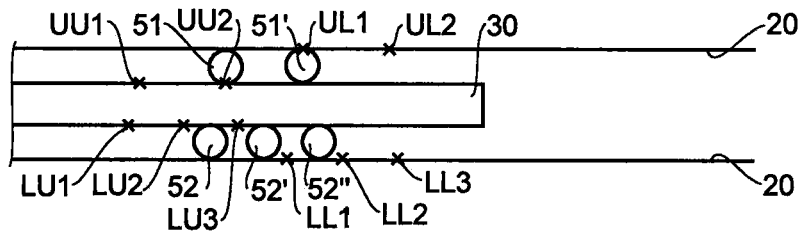

When the upper rail 30 is moved from the state shown in FIG. 3C by 10 mm (30 mm from the initial position) in the one direction, as shown in FIG. 3D, the upper ball 51 falls into the indentation UU2 on the upper rail 30, and the upper ball 51' falls into the indentation UL1 on the lower rail 20. However, since the other lower balls 52, 52', 52" do not fall into the indentations, the vibrations in the vertical direction are not generated in the upper rail 30.

Figure 3E:
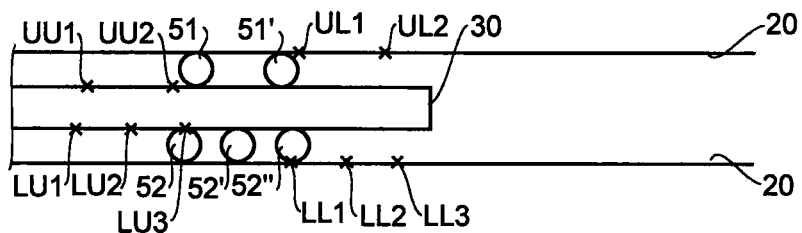

When the upper rail 30 is moved from the state shown in FIG. 3D by 10 mm (40 mm from the initial position) in the one direction, as shown in FIG. 3E, the lower ball 52 falls into the indentation LU3 on the upper rail 30, and the lower ball 52" falls into the indentation LL1 on the lower rail 20. However, since other lower ball 52' and upper balls 51, 51' do not fall into the indentations, the vibrations in the vertical direction are not generated in the upper rail 30.

Figure 3F:
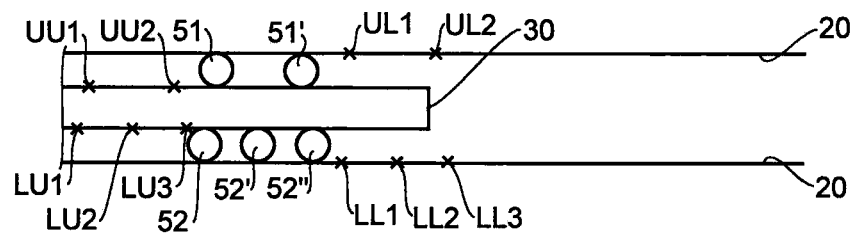

When the upper rail 30 is further moved in the one direction from the state shown in FIG. 3E, as shown in FIG. 3F, the lower balls 52, 52', 52" and the upper balls 51, 51' are positioned between the indentations LU1, LU2, LU3, UU1, and UU2 on the moving upper rail 30 and the indentations LL1, LL2, LL3, UL1, and UL2 on the fixed lower rail 20, so that the lower balls 52, 52', 52" and the upper balls 51, 51' do not fall into the indentations, and the vibrations in the vertical direction are not generated in the upper rail 30.

Figure 4A:
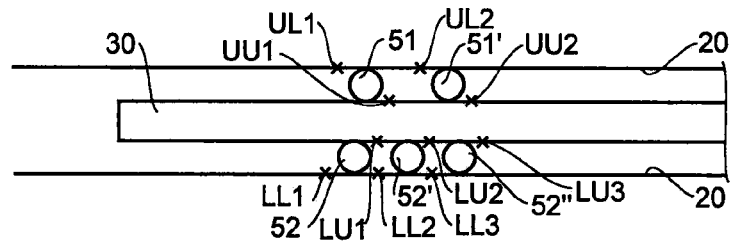
FIG. 4A to FIG. 4D are drawings for explaining the operation of the first embodiment and are configuration drawings in cross section taken along the line III-III in FIG. 2.

Subsequently, when the upper rail 30 is moved in the other direction (rightward in the drawing) by 10 mm from the initial position, as shown in FIG. 4A, the centers of the lower balls 52, 52', 52" and the upper balls 51, 51' move by 5 mm in the other direction.

Figure 4B:
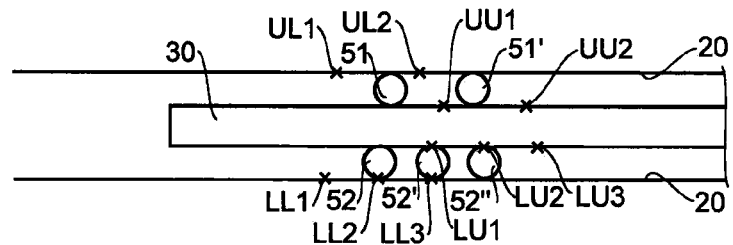

When the upper rail 30 is moved from the state shown in FIG. 4A by 10 mm (20 mm from the initial position) in the other direction, as shown in FIG. 4B, the lower ball 52 falls into the indentation LL2 on the lower rail 20, the lower ball 52' falls into the indentation LL3 on the lower rail 20 and the indentation LU1 on the upper rail 30, and the lower ball 52" falls into the indentation LU2 on the upper rail 30. However, since the other upper balls 51, 51' do not fall into the indentations, the vibrations in the vertical direction are not generated in the upper rail 30.

Figure 4C:
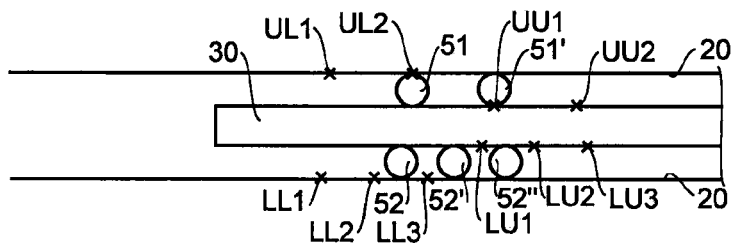

When the upper rail 30 is moved from the state shown in FIG. 4B by 10 mm (30 mm from the initial position) in the other direction, as shown in FIG. 4C, the upper ball 51 falls into the indentation UL2 on the lower rail 20, and the upper ball 51' falls into the indentation UU1 on the upper rail 30. However, since the other lower balls 52, 52', 52" do not fall into the indentations, the vibrations in the vertical direction are not generated in the upper rail 30.

Figure 4D:
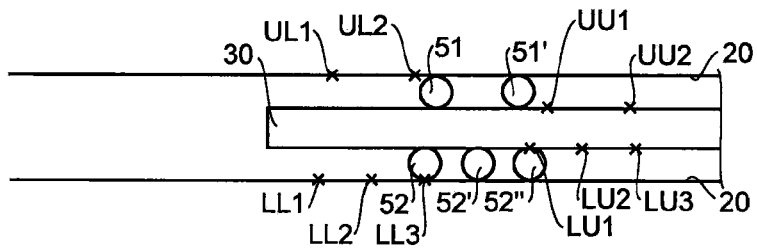

When the upper rail 30 is moved from the state shown in FIG. 4C in the one direction, as shown in FIG. 4D, the lower ball 52 falls into the indentation LL3 of the lower rail 20, and the lower ball 52" falls into the indentation LU1 of the upper rail 30. However, since other lower ball 52' and other upper balls 51, 51' do not fall into the indentations, the vibrations in the vertical direction are not generated in the upper rail 30.

When the upper rail 30 is further moved in the one direction from the state shown in FIG. 4D, the lower balls 52, 52', 52" and the upper balls 51, 51' are positioned between the indentations LU1, LU2, LU3, UU1, and UU2 on the moving upper rail 30 and the indentations LL1, LL2, LL3, UL1, and UL2 on the fixed lower rail 20 in the same manner as the case where the upper rail 30 is moved in the one direction, so that the lower balls 52, 52', 52" and the upper balls 51, 51' do not fall into the indentations, and the vibrations in the vertical direction are not generated in the upper rail 30.

In this configuration, since a plurality of the lower balls 52, 52', 52" and a plurality of the upper balls 51, 51' are supported by the retainer 40, and the center-to-center distance of the plurality of lower balls 52, 52', 52" lying next to each other (P2=10 mm) is different from the center-to-center distance of the plurality of upper balls 51 and 51" lying next to each other (P1=15 mm), the lower balls 52, 52', 52" and the upper balls 51, 51' do not fall simultaneously into the indentations LL1, LL2, LU1, LU2, LU3, UU1, UU2, UL1, and UL2 formed on the lower rail 20 and the upper rail 30, so that the vibrations in the vertical direction are not generated in the upper rail 30.

Second Embodiment

In the first embodiment, three of the lower balls are arranged so that the distances between the centers of the balls lying next to each other are equivalent. However, the invention is not limited thereto. A configuration such that the center-to-center distance of some of the lower balls lying next to each other from three of the lower balls are set to be the same as the center-to-center distance of the upper balls lying next to each other is also applicable.

Referring now to FIG. 5A to FIG. 5G, description will be given below. FIG. 5A to FIG. 5G are drawings for explaining the operation of the second embodiment and are drawings corresponding to the configuration drawings in cross section taken along the line in FIG. 2.

In the drawings, the center-to-center distance between the lower ball 52 and the lower ball 52' is set to 10 mm, and the center-to-center distance between the lower ball 52' and the lower ball 52" is set to 15 mm, and the center-to-center distance between the upper ball 51 and the upper ball 51' is set to 10 mm. The diameters of the lower balls 52, 52', 52" and the upper balls 51, 51' are set so that the distance of movement of the centers of the lower balls 52, 52', 52" and the upper balls 51, 51' become half the distance of movement of the upper rail 30.

Figure 5A:
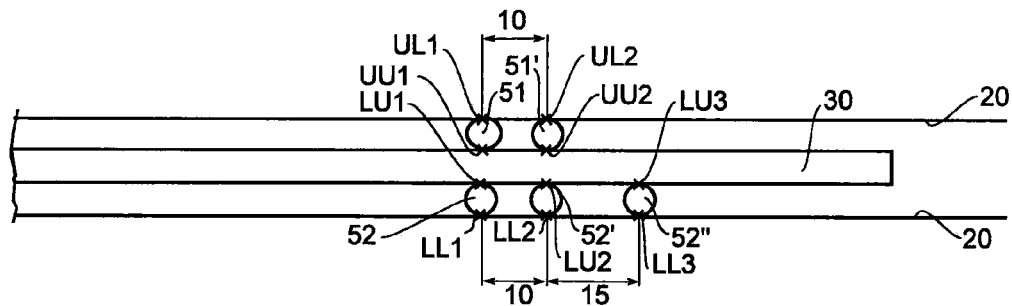
FIG. 5A to FIG. 5G are drawings for explaining the operation of a second embodiment and are drawings corresponding to the configuration drawings in cross section taken along the line III-III in FIG. 2.

FIG. 5A shows the state in which the upper rail 30 is used at the same position for a long time without being moved, that is, the initial position. Then, the lower rail 20 and the upper rail 30 are formed with the indentations at the points indicated by "x" by the lower balls 52, 52', 52" and the upper balls 51, 51'.

The indentation formed by the lower ball 52 on the lower rail 20 is designated by LL1, and the indentation formed by the lower ball 52 on the upper rail 30 is designated by LU1. The indentation formed by the lower ball 52' on the lower rail 20 is designated by LL2, and the indentation formed by the lower ball 52' on the upper rail 30 is designated by LU2. The indentation formed by the lower ball 52" on the lower rail 20 is designated by LL3, and the indentation formed by the lower ball 52" on the upper rail 30 is designated by LU3.

The indentation formed by the upper ball 51 on the lower rail 20 is designated by UL1, and the indentation formed by the upper ball 51 on the upper rail 30 is designated by UU1. The indentation formed by the upper ball 51' on the lower rail 20 is designated by UL2, and the indentation formed by the upper ball 51' on the upper rail 30 is designated by UU2.

Figure 5B:
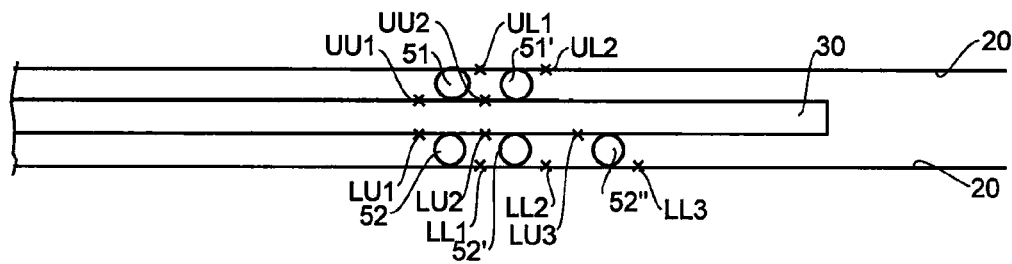

Here, when the upper rail 30 is moved in the one direction (leftward in the drawing) by 10 mm from the initial position, as shown in FIG. 5B, the centers of the lower balls 52, 52', 52" and the upper balls 51, 51' move by 5 mm in the one direction.

Figure 5C:
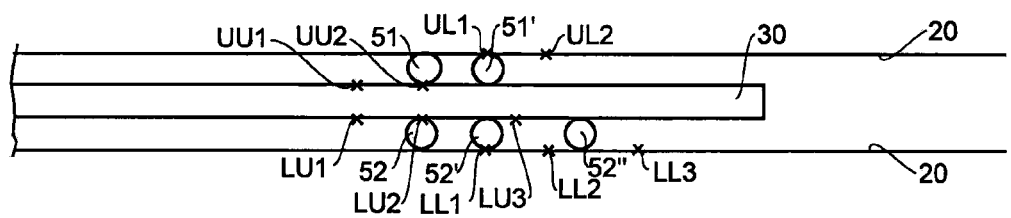

When the upper rail 30 is moved from the state shown in FIG. 5B by 10 mm (20 mm from the initial position) in the one direction, as shown in FIG. 5C, the lower ball 52 falls into the indentation LU2 of the upper rail 30, the lower ball 52' falls into the indentation LL1 of the lower rail 20, the upper ball 51 falls into the indentation UU2 of the upper rail 30, and the upper ball 51' falls into the indentation UL1 of the lower rail 20. However, since the other lower ball 52" does not fall into the indentations, the vibrations in the vertical direction are not generated in the upper rail 30.

Figure 5D:
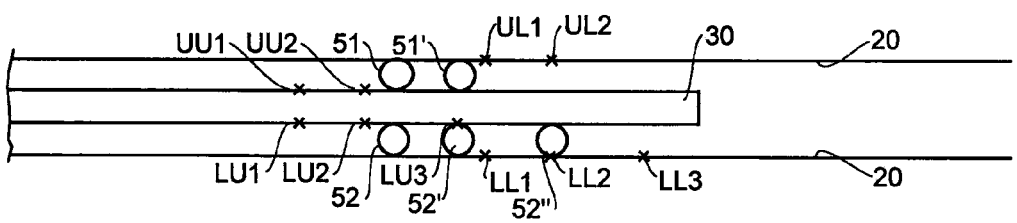

When the upper rail 30 is moved from the state shown in FIG. 5C by 10 mm (30 mm from the initial position) in the one direction, as shown in FIG. 5D, the lower ball 52' falls into the indentation LU3 on the upper rail 30, and the lower ball 52" falls into the indentation LL2 on the lower rail 20. However, since other lower ball 52 and upper balls 51, 51' do not fall into the indentations, the vibrations in the vertical direction are not generated in the upper rail 30.

Figure 5E:
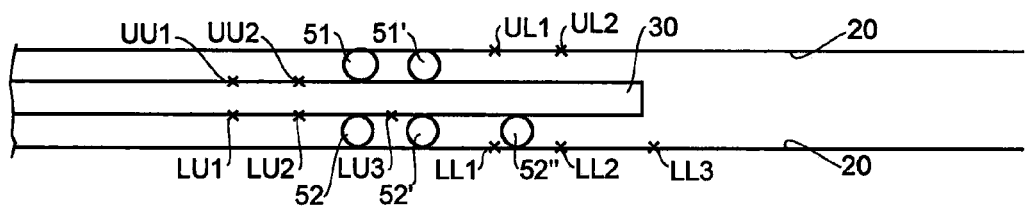

When the upper rail 30 is moved from the state shown in FIG. 5D by 10 mm (40 mm from the initial position) in the one direction, as shown in FIG. 5E, all the balls, that is, the lower balls 52, 52', 52" and upper balls 51, 51' do not fall into the indentations, so that the vibrations in the vertical direction are not generated in the upper rail 30.

Figure 5F:
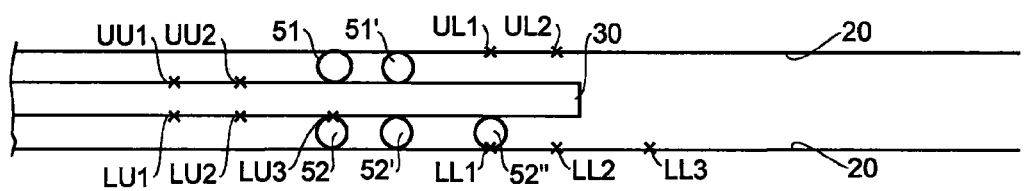

When the upper rail 30 is moved from the state shown in FIG. 5E by 10 mm (50 mm from the initial position) in the one direction, as shown in FIG. 5F, the lower ball 52 falls into the indentation LU3 on the upper rail 30, and the lower ball 52" falls into the indentation LL1. However, since other lower ball 52' and other upper balls 51, 51' do not fall into the indentations, the vibrations in the vertical direction are not generated in the upper rail 30.

Figure 5G:
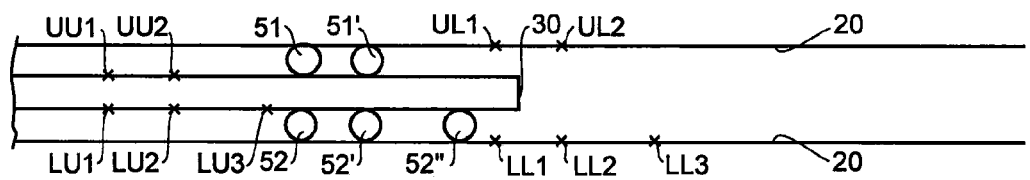

When the upper rail 30 is moved from the state shown in FIG. 5F by 10 mm (60 mm from the initial position) in the one direction, as shown in FIG. 5G, the lower balls 52, 52', 52" and the upper balls 51, 51' are positioned between the indentations LU1, LU2, LU3, UU1, and UU2 on the moving upper rail 30 and the indentations LL1, LL2, LL3, UL1, and UL2 on the fixed lower rail 20, so that the lower balls 52, 52', 52" and the upper balls 51, 51' do not fall into the indentations, and the vibrations in the vertical direction are not generated in the upper rail 30.

When the upper rail 30 is further moved from the state shown in FIG. 5G in the one direction, the lower balls 52, 52', 52" and the upper balls 51, 51' are positioned between the indentations LU1, LU2, LU3, UU1, and UU2 on the moving upper rail 30 and the indentations LL1, LL2, LL3, UL1, and UL2 on the fixed lower rail 20, so that the lower balls 52, 52', 52" and the upper balls 51, 51' do not fall into the indentations, and the vibrations in the vertical direction are not generated in the upper rail 30.

Also in the case where the upper rail 30 is moved in the other direction, there is no point where the upper rail 30 vibrates in the vertical direction except for the initial position.

Figure 8:
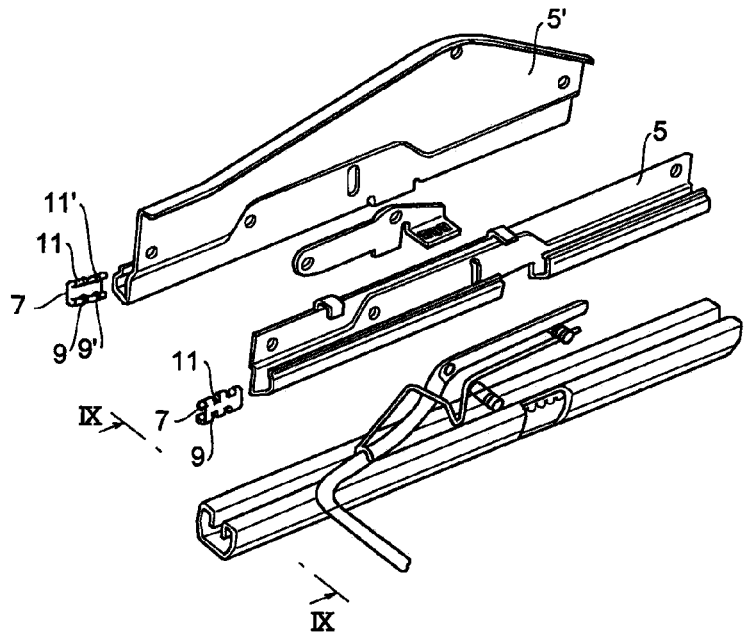
FIG. 8 is an exploded perspective view of a seat truck in the related art.
Figure 9:
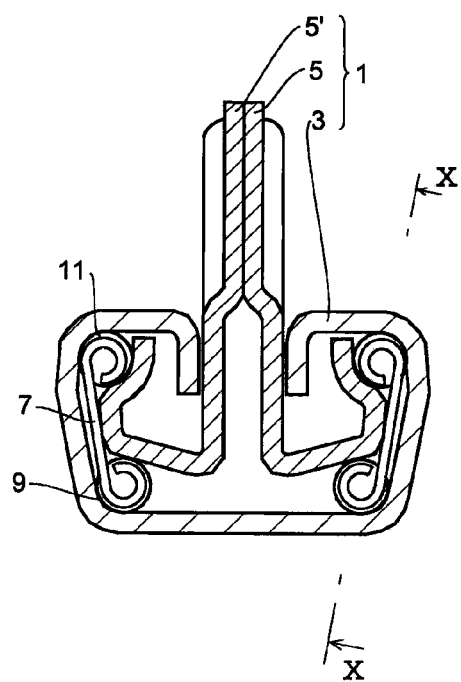
FIG. 9 is a cross-sectional view taken along the line IX-IX when the seat track in FIG. 8 is assembled.
Figure 10A:
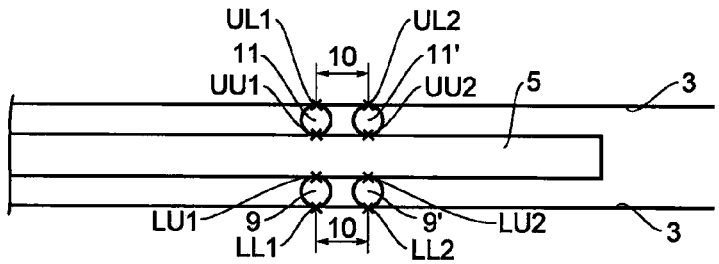
FIG. 10A to FIG. 10G are configuration drawings in cross section taken along the line X-X in FIG. 9.
Figure 10B:
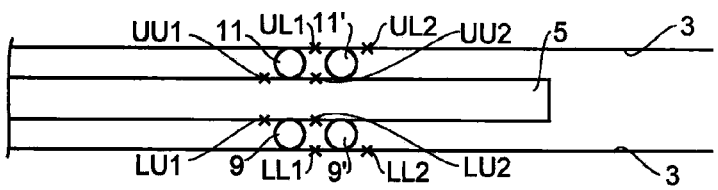
Figure 10C:
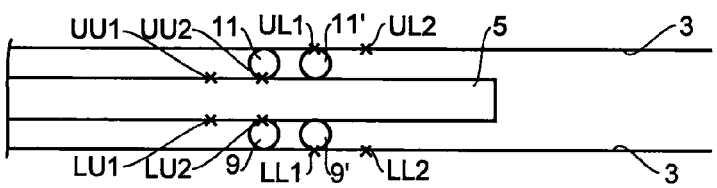
Figure 10D:
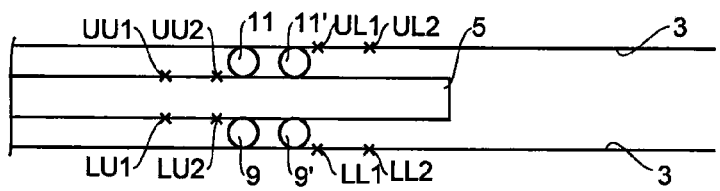
Figure 10E:
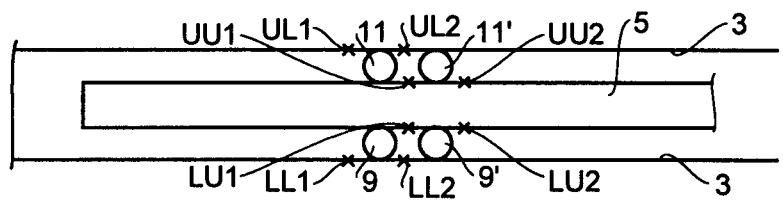
Figure 10F:
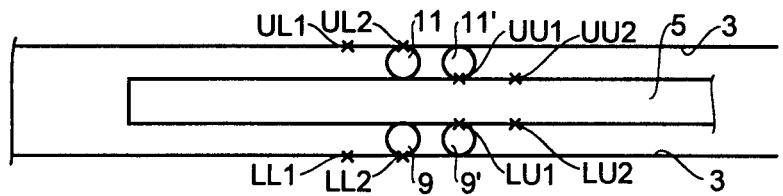
Figure 10G:
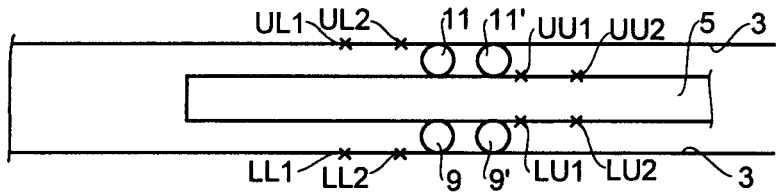

In other words, the configuration shown in FIG. 5A to FIG. 5G is a configuration shown in FIG. 8 described in the related art added with the lower ball 52" at a different center-to-center distance. In the configuration shown in FIG. 8, as shown in FIG. 5C, since the four balls fall into the indentations in a state in which the upper rail 30 is moved by 20 mm from the initial position, the vibrations in the vertical directions generate in the upper rail 30. However, in the configuration shown in FIG. 5A to FIG. 5G, by providing the lower ball 52" at a center-to-center distance with respect to the lower ball 52' lying next thereto different from that between the upper balls lying next to each other, the lower ball 52" does not fall into the indentation as shown in FIG. 5C even when the upper rail 30 is moved by 20 mm from the initial position, the vibrations in the vertical direction are not generated in the upper rail 30.

Third Embodiment

In a third embodiment, a resin-made slider 101 is provided instead of the upper balls 51, 51' in the second embodiment.

Referring now to FIG. 6A to FIG. 6G, description will be given below. FIG. 6A to FIG. 6G are drawing for explaining the operation of the third embodiment and are drawings corresponding to the configuration drawings in cross section taken along the line III-III in FIG. 2.

Figure 6A:
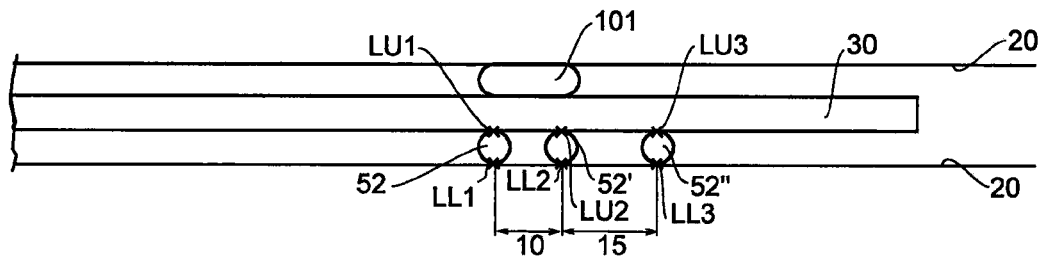
FIG. 6A to FIG. 6G are drawings for explaining the operation of a third embodiment and are drawings corresponding to the configuration drawings in cross section taken along the line III-III in FIG. 2.

FIG. 6A shows the state in which the upper rail 30 is used at the same position for a long time without being moved, that is, the initial position. Then, the lower rail 20 and the upper rail 30 are formed with the indentations at the points indicated by the "x" by the lower balls 52, 52', 52".

The indentation formed by the lower ball 52 on the lower rail 20 is designated by LL1, and the indentation formed by the lower ball 52 on the upper rail 30 is designated by LU1. The indentation formed by the lower ball 52' on the lower rail 20 is designated by LL2, and the indentation formed by the lower ball 52' on the upper rail 30 is designated by LU2. The indentation formed by the lower ball 52" on the lower rail 20 is designated by LL3, and the indentation formed by the lower ball 52" on the upper rail 30 is designated by LU3.

Since the material of the slider 101 is resin, the hardness is lower than the lower rail 20 or the upper rail 30. Therefore, the indentations are not formed on the lower rail 20 and the upper rail 30 by the slider 101.

Figure 6B:
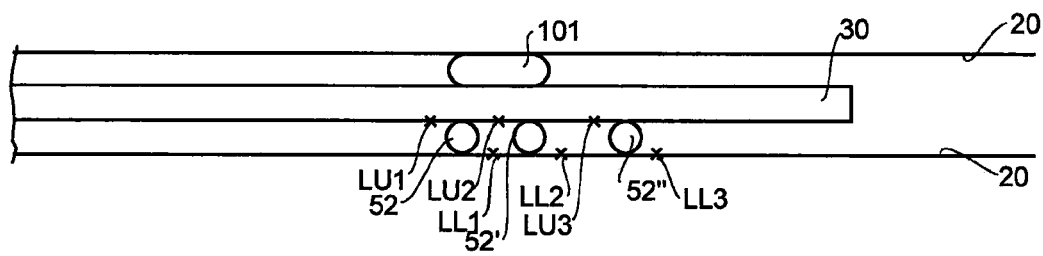

Here, when the upper rail 30 is moved from the initial position in the one direction (leftward in the drawing) by 10 mm, as shown in FIG. 6B, the lower balls 52, 52', 52" and slider 101 move by 5 mm in the one direction.

Figure 6C:
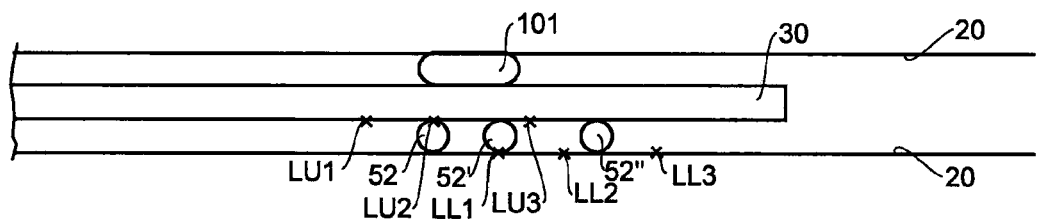

When the upper rail 30 is moved from the state shown in FIG. 6B by 10 mm (20 mm from the initial position) in the one direction, as shown in FIG. 6C, the lower ball 52 falls into the indentation LU2 of the upper rail 30, and the lower ball 52' falls into the indentation LL1 of the lower rail 20. However, since the other lower ball 52" does not fall into the indentation, the vibrations in the vertical direction are not generated in the upper rail 30.

Figure 6D:
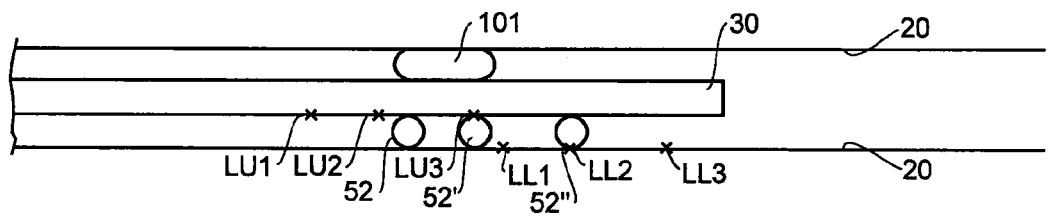

When the upper rail 30 is moved from the state shown in FIG. 6C by 10 mm (30 mm from the initial position) in the one direction, as shown in FIG. 6D, the lower ball 52' falls into the indentation LU3 of the upper rail 30, and the lower ball 52" falls into the indentation LL2 of the lower rail 20. However, since the other lower ball 52 does not fall into the indentation, the vibrations in the vertical direction are not generated in the upper rail 30.

Figure 6E:
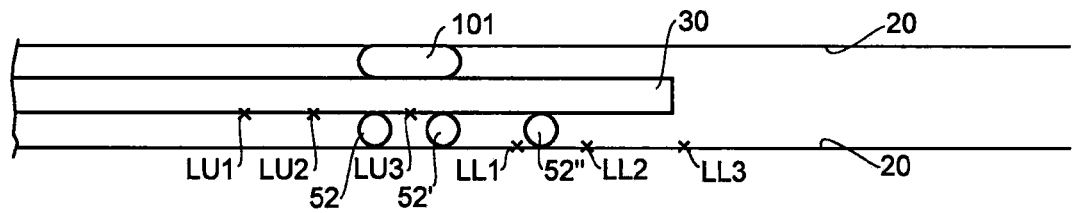

When the upper rail 30 is moved from the state shown in FIG. 6D by 10 mm (40 mm from the initial position) in the one direction, as shown in FIG. 6E, the lower balls 52, 52', 52" do not fall into the indentations, so that the vibrations in the vertical direction are not generated in the upper rail 30.

Figure 6F:
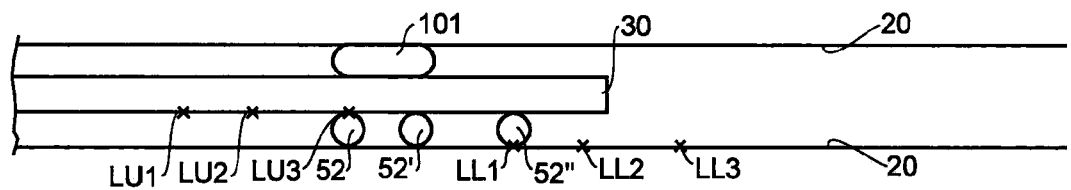

When the upper rail 30 is moved from the state shown in FIG. 6E by 10 mm (50 mm from the initial position) in the one direction, as shown in FIG. 6F, the lower ball 52 falls into the indentation LU3 of the upper rail 30, and the lower ball 52" falls into the indentation LL1 of the lower rail 20. However, since the other lower ball 52' does not fall into the indentation, the vibrations in the vertical direction are not generated in the upper rail 30.

Figure 6G:
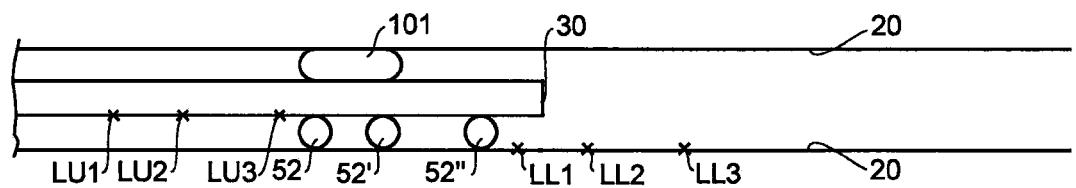

When the upper rail 30 is moved from the state shown in FIG. 6F by 10 mm (60 mm from the initial position) in the one direction, as shown in FIG. 6G, the lower balls 52, 52', 52" are positioned between the indentations LU1, LU2, LU3 on the moving upper rail 30 and the indentations LL1, LL2, LL3 on the fixed lower rail 20, so that the lower balls 52, 52', 52" do not fall into the indentations, and the vibrations in the vertical direction are not generated in the upper rail 30.

When the upper rail 30 is moved from the state shown in FIG. 6G further in the one direction, the lower balls 52, 52', 52" are positioned between the indentations LU1, LU2, LU3 on the moving upper rail 30 and the indentations LL1, LL2, LL3 on the fixed lower rail 20, so that the lower balls 52, 52', 52" do not fall into the indentations, and the vibrations in the vertical direction are not generated in the upper rail 30.

Also in the case where the upper rail 30 is moved in the other direction, there is no point where the upper rail 30 vibrates in the vertical direction except for the initial position.

Fourth Embodiment

In a fourth embodiment, the upper ball 51 and the lower ball 52' in the second embodiment are removed.

Referring now to FIG. 7A to FIG. 7G, description will be given below. FIG. 7A to FIG. 7G are drawings for explaining the operation of the fourth embodiment and are drawings corresponding to the configuration drawings in cross section taken along the line in FIG. 2.

Figure 7A:
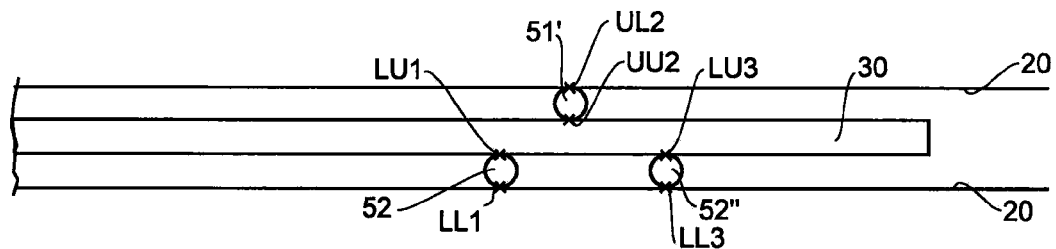
FIG. 7A to FIG. 7G are drawings for explaining the operation of a fourth embodiment and are drawings corresponding to the configuration drawings in cross section taken along the line III-III in FIG. 2.

FIG. 7A shows the state in which the upper rail 30 is used at the same position for a long time without being moved, that is, the initial position. Then, the lower rail 20 and the upper rail 30 are formed with indentations at points indicated by "x" by the lower balls 52, 52" and the upper ball 51'.

The indentation formed by the lower ball 52 on the lower rail 20 is designated by LL1, and the indentation formed by the lower ball 52 on the upper rail 30 is designated by LU1. The indentation formed by the lower ball 52" on the lower rail 20 is designated by LL3, and the indentation formed by the lower ball 52" on the upper rail 30 is designated by LU3.

The indentation formed by the upper ball 51' on the lower rail 20 is designated by UL2, and the indentation formed by the upper ball 51' on the upper rail 30 is designated by UU2.

Figure 7B:
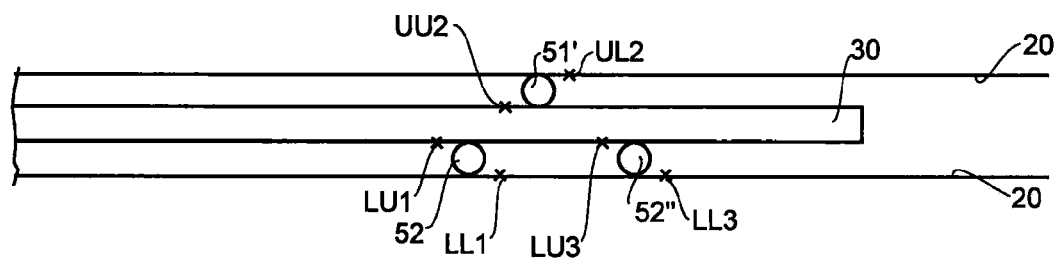

Here, when the upper rail 30 is moved from the initial position in the one direction (leftward in the drawing) by 10 mm, as shown in FIG. 7B, the centers of the lower balls 52, 52" and the upper ball 51' move by 5 mm in the one direction.

Figure 7C:
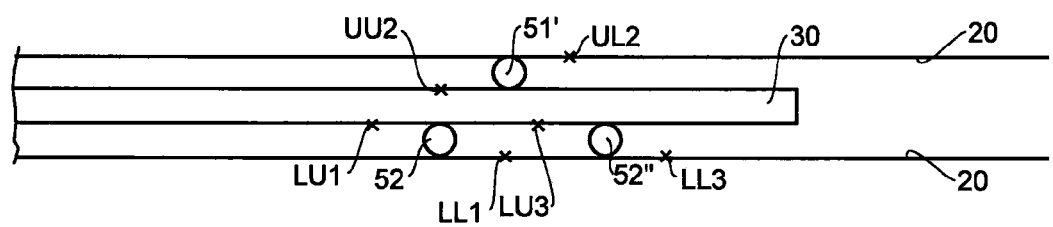

When the upper rail 30 is moved from the state shown in FIG. 7B by 10 mm (20 mm from the initial position) in the one direction, as shown in FIG. 7C, the lower balls 52, 52" and the upper ball 51' do not fall into the indentations, so that the vibrations in the vertical direction are not generated in the upper rail 30.

Figure 7D:
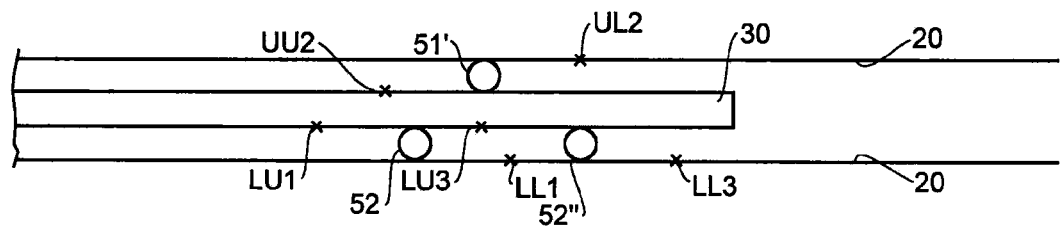

When the upper rail 30 is moved from the state shown in FIG. 7C by 10 mm (30 mm from the initial position) in the one direction, as shown in FIG. 7D, the lower balls 52, 52" and the upper ball 51' do not fall into the indentations, so that the vibrations in the vertical direction are not generated in the upper rail 30.

Figure 7E:
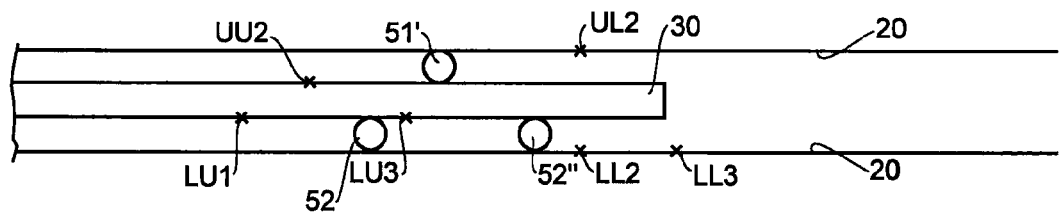

When the upper rail 30 is moved from the state shown in FIG. 7D by 10 mm (40 mm from the initial position) in the one direction, as shown in FIG. 7E, the lower balls 52, 52" and the upper ball 51' do not fall into the indentations, so that the vibrations in the vertical direction are not generated in the upper rail 30.

Figure 7F:
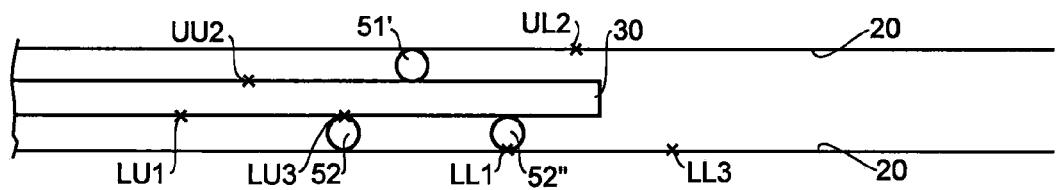

When the upper rail 30 is moved from the state shown in FIG. 7E by 10 mm (50 mm from the initial position) in the one direction, as shown in FIG. 7F, the lower ball 52 falls into the indentation LU3 on the upper rail 30, and the lower ball 52" falls into the indentation LL1 on the lower rail 20. However, since the other upper ball 51' does not fall into the indentation, the vibrations in the vertical direction are not generated in the upper rail 30.

Figure 7G:
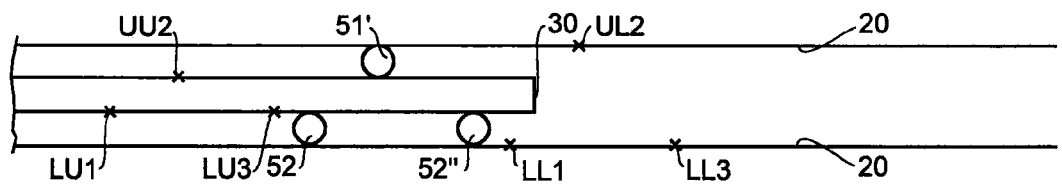

When the upper rail 30 is moved from the state shown in FIG. 7F by 10 mm (60 mm from the initial position) in the one direction, as shown in FIG. 7G, the lower balls 52, 52" and the upper ball 51' are positioned between the indentations LU1, LU3, UU2 on the moving upper rail 30 and the indentations LL1, LL3, UL2 on the fixed lower rail 20, so that the lower balls 52, 52" and the upper ball 51' do not fall into the indentations, and the vibrations in the vertical direction are not generated in the upper rail 30.

When the upper rail 30 is further moved from the state shown in FIG. 7G in the one direction, the lower balls 52, 52" and the upper ball 51' are positioned between the indentations LU1, LU3, UU2 on the moving upper rail 30 and the indentations LL1, LL3, UL2 on the fixed lower rail 20, so that the lower balls 52, 52" and the upper ball 51' do not fall into the indentations, and the vibrations in the vertical direction are not generated in the upper rail 30.

Also in the case where the upper rail 30 is moved in the other direction, there is no point where the upper rail 30 vibrates in the vertical direction except for the initial position.

The invention is not limited to the above-described embodiment. In the embodiments described above, the example in which the balls are used as the rotating bodies, rollers are also applicable.

In the first embodiment to the fourth embodiment, the vertical positional relationship between the upper balls and the lower balls, or between the slider and the lower balls may be inverted.

This application is based on Japanese Patent Application serial no. JP2010-178468 filled in Japan Patent Office on Aug. 9, 2010, the contents of which are hereby incorporated by reference.

Although the present invention has been fully described by way of example with reference to the accompanying drawings, it is to be understood that various changes and modification will be apparent to those skilled in the art. Therefore, unless otherwise such changes and modification depart from the scope of the present invention hereinafter defined, they should be construed as being included therein.

What is claimed is:

1. A seat track comprising:
a lower rail provided on a floor side;
an upper rail configured to movably engage the lower rail and allow a seat to be mounted thereon;
a retainer arranged in a space between the lower rail and the upper rail;
three or more rotating bodies rotatably supported by the retainer and configured to come into contact with both the lower rail and the upper rail,
wherein the lower and upper rails contain indentations on a surface that comes into contact with the rotating bodies, and
wherein the rotating bodies are arranged in such a manner that all the rotating bodies do not fall into indentations simultaneously except for an initial position where the indentations are formed on the lower rail and the upper rail by the rotating bodies.

2. A seat track according to claim 1, wherein the three or more rotating bodies are provided at positions different from each other in the fore-and-aft direction of the lower rail, and are arranged so that center-to-center distances in the fore-and-aft direction of the lower rail between the rotating bodies lying next to each other are different from each other.

3. The seat track according to claim 1, wherein the rotating bodies include a lower rotating body rotatably supported on a lower portion of the retainer and an upper rotating body rotatably supported on an upper portion of the retainer.

* * * * *